April 8, 1930.                J. N. JOHNSON                1,753,420
                              VEHICLE SPRING
                           Filed Feb. 23, 1926           2 Sheets-Sheet 1
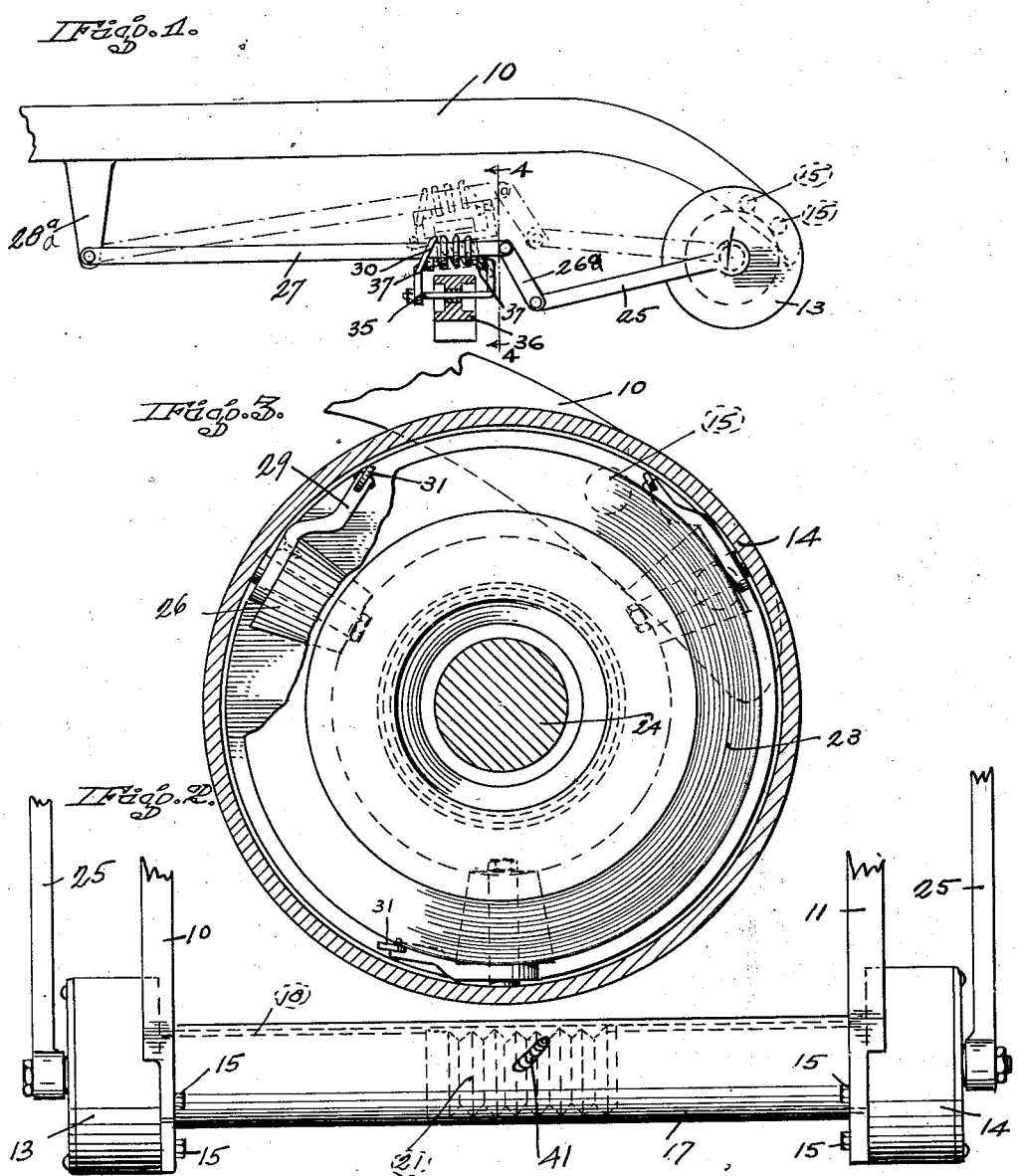
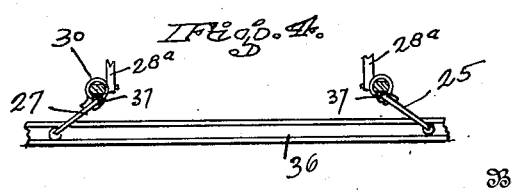
Inventor
JOSEPH N. JOHNSON
By
Attorneys.

April 8, 1930.  J. N. JOHNSON  1,753,420
VEHICLE SPRING
Filed Feb. 23, 1926  2 Sheets-Sheet 2
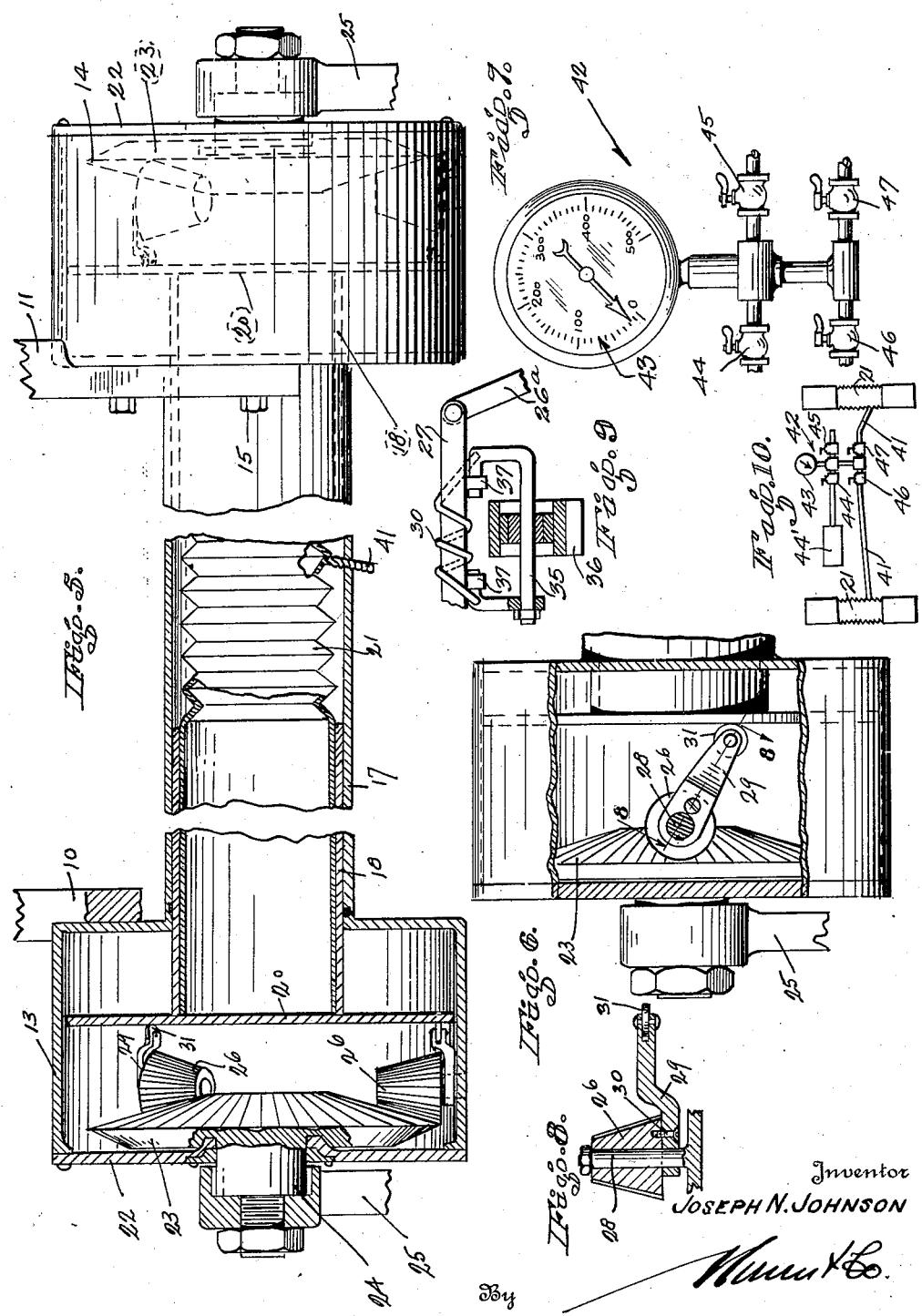
Inventor
JOSEPH N. JOHNSON
By 
Attorneys Patented Apr. 8, 1930

1,753,420

UNITED STATES PATENT OFFICE

JOSEPH N. JOHNSON, OF IRWIN, CALIFORNIA

VEHICLE SPRING

Application filed February 23, 1926. Serial No. 90,129.

This invention relates to vehicle springs.

In the drawings, Figure 1 is a side elevation of my improved device as applied to the front portion of one of the sides of the frame of an automobile.

Figure 2 is a plan view of the front portion of Figure 1.

Figure 3 is an enlarged detail of the front portion of Figure 1, the cover of the drum being removed and part of the mechanism also being removed to more clearly show other mechanism.

Figure 4 is a view of a portion of Figure 1 taken on the line 4—4 of Figure 1.

Figure 5 is a front view of Figure 1 partly in section and partly broken away.

Figure 6 is a bottom plan view partly in section and partly broken away of one end of the left end-portion of Figure 5.

Figure 7 is an elevational view of a gauge employed in my invention.

Figure 8 is a section taken on line 8—8 of Figure 6.

Figure 9 is an enlarged detail of a portion of the device; and Figure 10 is a diagrammatic view of the connections between the tubes and compressed air tank.

The spring of my invention is to be applied to both sides of the front and rear portions of the chassis of a vehicle.

In Figure 2, the numerals 10 and 11 indicate the sides of the frame of the chassis. To the front ends of the sides 10 and 11 are respectively secured drums 13 and 14 by means of bolts 15. The inner sides of the drums 13 and 14 are apertured as shown in Figure 5, and a tube 17 joins the drums 13 and 14 and encircles the apertures in the inner sides of the drums. Slidable tubes 18 extend from within the tube 17 into the drums 13 and 14. Transversely across from the tubes 18 are plates 20. A bellows or collapsible tube 21 extends between the tubes 18 and has its end portions in these tubes slidable therein. The drums 13 and 14 are provided with removable covers 22. Master gears 23 are disposed within the drums 13 and 14 between the covers 22 and the plates 20.

Integral with the gears 23 are hubs 24, journaled in covers 22. The gears 23 are beveled and engage with idler beveled gears 26. The idler gears 26, as shown in Figure 8, rotate on pins 28 which extend from the peripheries of their respective drums. The pins 28 pass through cams 29 which are secured to the rollers 26 by means of screws 30. In the ends of the cams 29 are rotatably mounted wheels 31, which bear against the plates 20. Secured to the hubs 24 are arms 25 which are pivotally connected to links 26ª.

The links 26ª are pivotally connected to rods 27, which are pivotally connected to projections 28ª, which depend from the sides 10 and 11 respectively. Coil springs 30 are wound around the rods 27, the coil on one spring being wound oppositely from the direction in which the other spring is wound.

The ends of each coil 30 bear against opposite sides of a link 35, which passes through the front axle 36. The ends of the link 35 extend into depending projections 37, which are secured to the rods 27. It will be understood that the mechanism described is applied to the front of the chassis and may also be applied to the rear thereof. This mechanism permits a slight resiliency between the axle 36 and rod 27.

The flexible tube 21 has a flexible tube 41 extending therefrom, and connected with a pressure tank of compressed air, so that compressed air may be led thereinto. A gauge 42, shown in Figure 7, is employed in connection with my invention and comprises a pressure reading portion 43, a valve 44 which leads to the pressure tank 44', a valve 45 which leads to the atmosphere, a valve 46 which leads into the tube 21 of the rear spring, and a valve 47 which leads into the corresponding tube in the front spring.

As will be readily understood, by opening the valves 46 or 47, the pressure in the flexible tube 21 of the rear spring or front spring respectively, may be ascertained. By opening the valve 44 the pressure in the bellows may be read.

It will be understood that as the automobile equipped with my invention is traveling, the link mechanism, shown in full lines in Figure 1, may be thrown into position, shown in dotted lines in the same figure, and that the master gears 23 will be thereby turned. The master gears will rotate the idler gears 26, causing the cams 29, which turn with the idlers 26, to push the plates 20 inwardly so that the bellows tubes 21 are partially collapsed or compressed. The collapsing of the tube 21 acts as a braking means to the movement of the arms 25 in one direction.

It is to be understood that the collapsible tubes 21 may be filled with other materials than air and that they may even be done away with if equivalent structures are provided.

The device of my invention has the following advantages:

1. It will permit a greater vertical play or range than the usual type of spring.
2. While retaining the usual wheelbase, it nearly doubles the effective or working wheelbase, as the latter equals the total length of the frame plus the length of the spring arms.
3. A long spring at low tension absorbs shocks better and transmits less vibration than a short spring under high tension. This construction permits the equivalent of a long spring at low tension in a small space.
4. There is no positive or unyielding connection, such as spring shackle bolts, between the spring and the frame.
5. The spring acts as an equalizer between opposite sides of the frame, preventing distortion or twisting of the frame, preventing body squeaks and therefore permitting equal strength with lighter construction.
6. No shock is transmitted directly in the direction of the frame.
7. When rounding corners, to counteract momentum, the outside of the body or car is slightly raised and the inside is slightly lowered by the momentum itself.
8. The tension of the spring can be changed and regulated at the cowl to meet varying load requirements.

While I have described one embodiment of my invention, modifications thereof may be readily devised without departing from the spirit of my invention, and it is to be understood that such modifications come within the scope of the appended claims.

I claim:—

1. In a vehicle spring, extensible link mechanism, a master gear adapted to be turned by said link mechanism, idler gears meshing with said master gear, a cam secured to each idler gear and resilient means adapted to be compressed by said cams.

2. In a vehicle spring, extensible link mechanism, a master gear adapted to be turned by said link mechanism, idler gears meshing with said master gear, a cam secured to each idler gear and resilient means adapted to be compressed by said cams, said resilient means comprising a flexible tube.

3. In a vehicle spring, extensible link mechanism, a master gear adapted to be turned by said link mechanism, idler gears meshing with said master gear, a cam secured to each idler gear and resilient means adapted to be compressed by said cams, said resilient means comprising a flexible tube, said tube being adapted to receive a fluid.

4. In a vehicle spring, extensible link mechanism, a master gear adapted to be turned by said link mechanism, idler gears meshing with said master gear, a cam secured to each idler gear and resilient means adapted to be compressed by said cams, said resilient means comprising a flexible tube, said tube being adapted to receive a fluid, said fluid being air under pressure.

5. In a vehicle spring, extensible link mechanism, a master gear adapted to be turned by said link mechanism, idler gears meshing with said master gear, a cam secured to each idler gear and resilient means adapted to be compressed by said cams, said resilient means comprising a flexible tube, said tube being adapted to receive a fluid, and a gauge for reading the pressure of fluid in said tube.

6. In a vehicle spring, extensible link mechanism, a master gear adapted to be turned by said link mechanism, idler gears meshing with said master gear, a cam secured to each idler gear and resilient means adapted to be compressed by said cams, said resilient means comprising a flexible tube, said tube being compressive.

7. In a vehicle spring, extensible link mechanism, a master gear adapted to be turned by said link mechanism, idler gears meshing with said master gear, a cam secured to each idler gear and resilient means adapted to be compressed by said cams, and a drum enclosing said master gear and said idler gear.

8. In a vehicle spring, extensible link mechanism, a master gear adapted to be turned by said link mechanism, idler gears meshing with said master gear, a cam secured to each idler gear and resilient means adapted to be compressed by said cams, and a drum enclosing said master gear and said idler gear, said drum and said link mechanism being secured to the frame of a vehicle.

9. The combination with a vehicle frame, of pneumatic shock absorbing means disposed between the sides of the frame and having end members movable toward each other, an axle, and means connecting the ends of the axle with said members for causing them to move inwardly when the axle moves upwardly with respect to the frame.

10. The combination with a vehicle, of a shock absorber disposed between the sides of said vehicle, an axle, arms connecting said axle with said shock absorber, said shock absorber including a compressible container and means operatively connected to said arms for compressing said container when said arms are moved.

JOSEPH N. JOHNSON.